(12) United States Patent
Redini

(10) Patent No.: US 12,239,186 B2
(45) Date of Patent: Mar. 4, 2025

(54) STRUCTURE AND PROCEDURE FOR MAKING A SHOE WITH KNITTED UPPER

(71) Applicant: TRERE' INNOVATION S.r.l., Asola (IT)

(72) Inventor: Marco Redini, Asola (IT)

(73) Assignee: TRERE' INNOVATION S.R.L., Asola (IT)

(*) Notice: Subject to any disclaimer, the term of this patent is extended or adjusted under 35 U.S.C. 154(b) by 0 days.

(21) Appl. No.: 17/793,737

(22) PCT Filed: Jan. 22, 2021

(86) PCT No.: PCT/IT2021/000001
§ 371 (c)(1),
(2) Date: Jul. 19, 2022

(87) PCT Pub. No.: WO2021/149085
PCT Pub. Date: Jul. 29, 2021

(65) Prior Publication Data
US 2023/0055536 A1    Feb. 23, 2023

(30) Foreign Application Priority Data

Jan. 24, 2020    (IT) .......................... 102020000001459

(51) Int. Cl.
*A43B 13/38*    (2006.01)
*A43B 1/04*    (2022.01)
(Continued)

(52) U.S. Cl.
CPC ............... *A43B 13/38* (2013.01); *A43B 1/04* (2013.01); *A43B 7/142* (2013.01); *A43B 9/18* (2013.01);
(Continued)

(58) Field of Classification Search
CPC ......... A43B 13/38; A43B 17/003; A43B 9/18; A43B 1/04; B29D 35/062; B29D 35/128; B29D 35/146
See application file for complete search history.

(56) References Cited

U.S. PATENT DOCUMENTS

| | | | | |
|---|---|---|---|---|
| 4,651,444 A | * | 3/1987 | Ours | B29D 35/084 12/142 T |
| 4,689,900 A | * | 9/1987 | Ishibashi | A43B 1/0054 36/103 |

(Continued)

FOREIGN PATENT DOCUMENTS

FR    2576195 A1 *    7/1986

*Primary Examiner* — Heather Mangine
(74) *Attorney, Agent, or Firm* — Wenderoth, Lind & Ponack, L.L.P.

(57) ABSTRACT

A procedure for making a shoe including steps of weaving/construction of an upper, forming the upper in which two previously constructed stockings are a tube that is closed on one side while the other end of the tube remains open, subjecting the upper to a steam jet that dampens and softens a thermosetting polymer yarn, and passing the upper through a high-temperature kiln. Construction of the sole entails inserting the upper into a shoe-tree of a mould, positioning the shoe-tree with the upper and closure between two rings of the mould for polyurethane injection. Because of the presence of the arch structure a barrier that limits the passage thereof to the inner part of the upper, with filling of the mould, passage of predetermined quantities of polyurethane only through the slots of the arch structure permitting joint points to be created between the sole and upper and with the inner.

11 Claims, 8 Drawing Sheets

(51) Int. Cl.
    *A43B 7/142*              (2022.01)
    *A43B 9/18*               (2006.01)
    *A43B 23/02*             (2006.01)
    *B29C 45/14*             (2006.01)
    *B29D 35/06*             (2010.01)
    *B29D 35/12*             (2010.01)

(52) U.S. Cl.
    CPC .... *A43B 23/0235* (2013.01); *B29C 45/14311* (2013.01); *B29C 45/14811* (2013.01); *B29D 35/062* (2013.01); *B29D 35/064* (2013.01); *B29D 35/128* (2013.01); *B29C 2045/14327* (2013.01)

(56) References Cited

U.S. PATENT DOCUMENTS

| | | | | |
|---|---|---|---|---|
| 5,628,127 A * | 5/1997 | Notzold | A43B 9/16 | 36/55 |
| 5,727,271 A * | 3/1998 | Romanato | B29D 35/10 | 12/142 E |
| 10,966,487 B2 * | 4/2021 | Chang | A43B 23/022 | |
| 11,286,591 B2 * | 3/2022 | Ly | D04B 1/02 | |
| 11,408,104 B2 * | 8/2022 | Dardinski | D04B 9/46 | |
| 11,445,765 B2 * | 9/2022 | Giorgini | A41B 11/02 | |
| 11,445,779 B2 * | 9/2022 | Hipp | A43B 23/024 | |
| 2003/0136024 A1 * | 7/2003 | Su | B29D 35/062 | 36/12 |
| 2004/0043212 A1 * | 3/2004 | Grynaeus | D06M 23/12 | 442/61 |
| 2007/0296115 A1 * | 12/2007 | Truelsen | B29D 35/062 | 36/83 |
| 2008/0196278 A1 * | 8/2008 | Zanatta | A43B 17/102 | 36/3 R |
| 2011/0232008 A1 * | 9/2011 | Crisp | G06Q 10/06 | 12/18.1 |
| 2011/0283562 A1 * | 11/2011 | Shrum | B32B 25/10 | 427/289 |
| 2011/0302806 A1 * | 12/2011 | Auger | A43B 13/40 | 36/44 |
| 2014/0189964 A1 * | 7/2014 | Wen | A43B 23/021 | 36/87 |
| 2015/0101134 A1 * | 4/2015 | Manz | A43D 95/00 | 12/142 R |
| 2015/0107307 A1 * | 4/2015 | Kosui | D04B 1/26 | 2/239 |
| 2015/0208752 A1 * | 7/2015 | Licklider | A43B 1/02 | 36/44 |
| 2015/0237960 A1 * | 8/2015 | Mallen | D03D 1/00 | 36/55 |
| 2015/0342261 A1 * | 12/2015 | Boucher | A43B 7/1495 | 12/142 G |
| 2016/0185062 A1 * | 6/2016 | Boucher | A42B 3/06 | 264/516 |
| 2016/0198798 A1 * | 7/2016 | Ikenaka | D04B 1/22 | 66/170 |
| 2016/0263790 A1 * | 9/2016 | Wan | B29C 33/04 | |
| 2016/0278471 A1 * | 9/2016 | Rossignoli | A43D 3/026 | |
| 2016/0302524 A1 * | 10/2016 | Smith | A43B 13/12 | |
| 2017/0066212 A1 * | 3/2017 | de Backer | A43D 3/02 | |
| 2017/0135443 A1 * | 5/2017 | Leiser | A43B 17/003 | |
| 2017/0208900 A1 * | 7/2017 | Boucher | A43B 23/087 | |
| 2017/0311672 A1 * | 11/2017 | Hipp | A43B 23/0235 | |
| 2017/0325546 A1 * | 11/2017 | Becker | B29C 51/28 | |
| 2017/0340064 A1 * | 11/2017 | Boucher | B29D 35/126 | |
| 2018/0020761 A1 * | 1/2018 | Cai | D03D 15/587 | 36/48 |
| 2018/0042340 A1 * | 2/2018 | Kuo | D04B 1/108 | |
| 2018/0153265 A1 * | 6/2018 | Jeandin | A43D 13/00 | |
| 2018/0184759 A1 * | 7/2018 | Cherneski | A43B 17/18 | |
| 2018/0206585 A1 * | 7/2018 | Cai | D04B 1/22 | |
| 2018/0255864 A1 * | 9/2018 | Kuo | A43B 23/04 | |
| 2018/0332920 A1 * | 11/2018 | Burch | A43B 23/0215 | |
| 2019/0159550 A1 * | 5/2019 | Dean | A43B 1/04 | |
| 2019/0350303 A1 * | 11/2019 | Huffa | D04B 1/22 | |
| 2020/0029647 A1 * | 1/2020 | Unnewehr | A43B 23/0255 | |
| 2020/0068992 A1 * | 3/2020 | Hsiao | B29D 35/122 | |
| 2020/0245712 A1 * | 8/2020 | Lai | A43B 19/00 | |
| 2020/0253326 A1 * | 8/2020 | Choi | A43B 3/0068 | |
| 2020/0298520 A1 * | 9/2020 | Hubert | B33Y 80/00 | |
| 2020/0329816 A1 * | 10/2020 | Basa | B29D 35/00 | |
| 2020/0345102 A1 * | 11/2020 | Choi | A43B 13/127 | |
| 2020/0405003 A1 * | 12/2020 | Poegl | A43B 23/024 | |
| 2021/0008823 A1 * | 1/2021 | Cartabbia | A43B 1/04 | |
| 2021/0037913 A1 * | 2/2021 | Bessho | A43B 1/04 | |
| 2021/0112926 A1 * | 4/2021 | Bessho | A43B 23/0215 | |
| 2021/0123171 A1 * | 4/2021 | Hendrix | A41B 11/02 | |
| 2021/0177095 A1 * | 6/2021 | Santos | A43B 9/02 | |
| 2021/0186156 A1 * | 6/2021 | Pogl | D04B 1/22 | |
| 2021/0219659 A1 * | 7/2021 | Ventenat | A43B 23/042 | |
| 2021/0221115 A1 * | 7/2021 | Lancini | B29C 66/1122 | |
| 2022/0142289 A1 * | 5/2022 | Lonati | A43B 23/0265 | |
| 2022/0354218 A1 * | 11/2022 | Tatibouet | A43B 23/0255 | |
| 2023/0055536 A1 * | 2/2023 | Redini | B29C 45/14311 | |

* cited by examiner

FIG.5
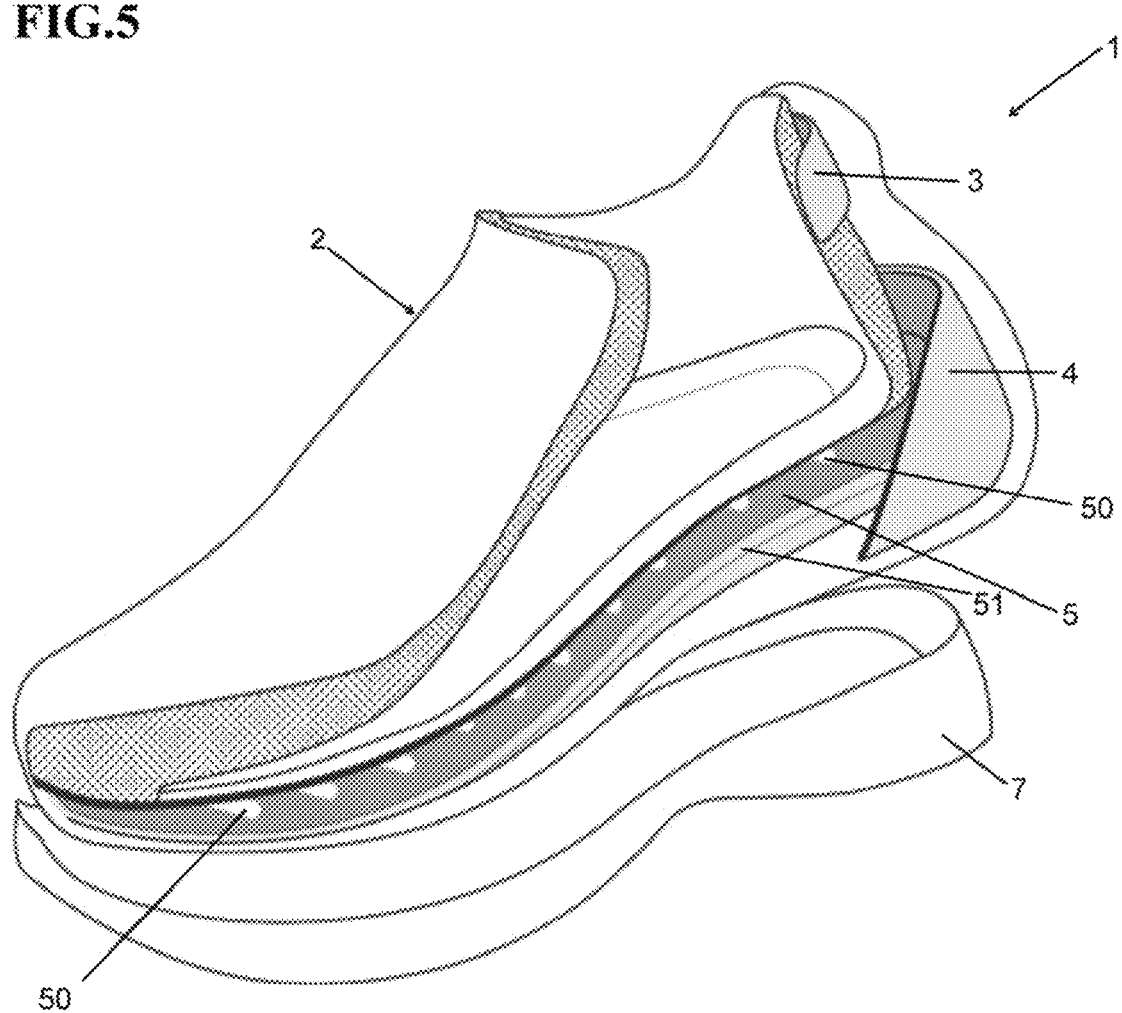
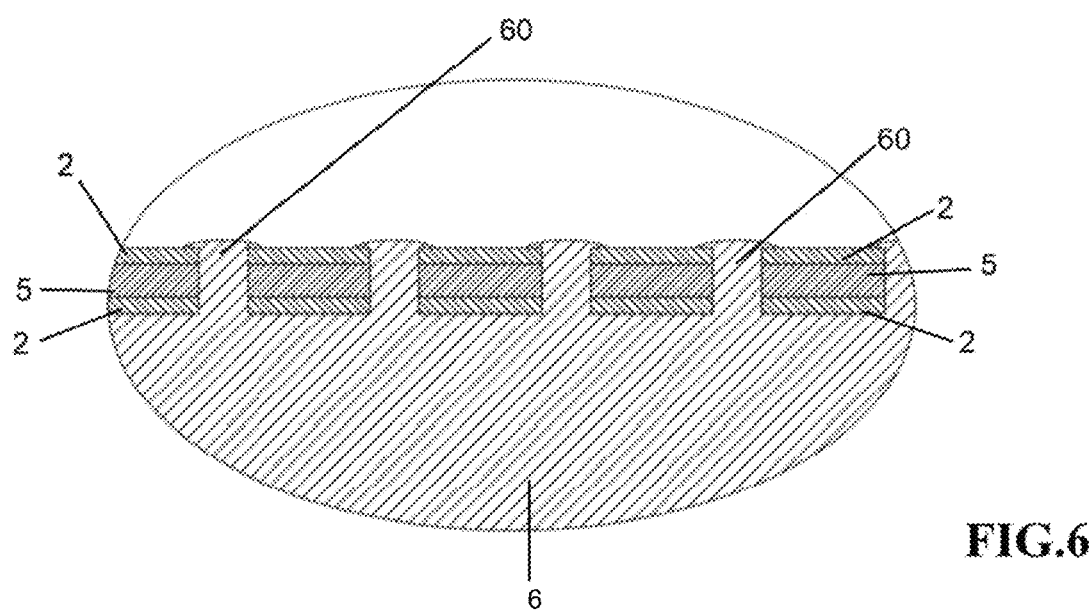
FIG.6

STRUCTURE AND PROCEDURE FOR MAKING A SHOE WITH KNITTED UPPER

TECHNICAL FIELD

The present invention relates to a structure and procedure for making a shoe with knitted upper that is particularly suitable for providing differentiated structures both in terms of volume and elasticity to the different areas that contain the feet and for ensuring optimum flexure and protection of the foot.

BACKGROUND ART

As is known, footwear is a clothing accessory that has the task of protecting the foot and substantially consists of a sole that is the lower part in contact with the ground and of an upper, the upper part, which generally consists of several parts to cover the foot and keep the sole in position. In particular, the upper can have different ornaments, colours and shapes and is joined to the sole by stitching or gluing. Further, the upper is in most cases made of natural leather or synthetic materials or something else.

In addition, in the footwear there is often an instep that is the inner part that forms the space between the sole and the upper.

In fact, the shoe is an object that has always been used to protect the foot when the user walks, runs, etc.; it is used to prevent shocks being able to injure or fatigue the bone and/or muscular structure.

Currently, there are several types of shoes on the market and a large component relates to sports/casual shoes, which are a large share of the market.

Today, specialization is becoming increasingly fierce in the search for performance that the shoe can offer and for increasingly technological features for the construction of the parts that make up the shoe.

One type of shoe that is attracting a lot of interest and attention from users is the shoe that has a knitted upper portion.

The first shoes of this type were football boots with knitted uppers that were defined as a sort of second skin because they were so soft. In particular, the knitted upper was covered by a thin layer of leather to protect the knitted weave.

The previously illustrated shoe was very comfortable, but over time it revealed different shortcomings due to the delicacy of the upper, the tendency to become worn of the upper and the poor protection of zones of the feet subject to blows, also in view of the type of use. Further, the upper showed limited breathability and easy deformation of the structure of the upper with use. In fact, part of the previously illustrated problems are due to the fact that the thickness of the fabric that makes up the upper is constant but the different parts of the foot require differentiated levels of grip, resistance and consistency of the fabric.

Subsequently, to overcome the limits displayed by the previously illustrated shoe, manufacturers started to manufacture a "stocking" using inlay machines or circular machines in which the stocking consists of the structure of two stockings that join at the tip, inserting thermosetting yarns into the processing. Once processing has terminated, one stocking is turned over on the other stocking and is subjected to a hardening and stabilization process by passing through a steam kiln at high temperature.

Another type involves making a stocking as described previously, but with the addition of a third stocking that is made completely of heat setting material that is then inserted between the other two stockings.

Also in this case, the structure is subjected to a hardening and stabilizing process by being passed through a high temperature steam kiln.

The shoes made according to the methods disclosed above have a significant drawback that is due to limited elasticity and breathability because of the presence on the entire weave of thermosetting yarns that make the upper part of the footwear stiff and rather hard. In addition, important limits have been found in the three-dimensional design, which is fundamental to following and structuring the dynamics of the foot, in the flexibility of some areas, in the protection in the zone of the tip, in the torsional stability of the heel, and in the containment of the foot.

In addition to what has been illustrated so far, the soles that complete the shoe with the types of upper mentioned previously are joined by gluing with several problems of stiffness, limited grip of the components with movement and the presence of infiltrations of adhesive into the knitted fabric, contact with which is annoying and hard to the skin of the foot. Another manner of joining sole and upper is by stitching, but also this has been shown to give problems due to wear that the stitching yarn exerts on the knitted fabric of the upper. Further, in both methods of assembly, problems have been detected that are due to the considerable stiffness of the sole that, being moulded with rather great thicknesses, limits and reduces the flexibility of the shoe, drastically lowering comfort for the user.

In particular, the applicant is aware of patent application US 2017/0181501, which illustrates a shoe made with the techniques described previously where the upper consists of two stockings, one turned to the other and with an inset interposed to improve the comfort of the foot in contact with the sole and have a structure that offers a surface for joining with the sole. Further, other functional elements are interposed between the two stockings that are defined as envelopes to improve certain functions and create sectors of protection of the foot. In particular, the construction of the upper provides for the presence of a structure that serves to receive the laces for tying the shoe to which the stockings are then fitted.

In particular, the cited patent application illustrates how the upper and the sole are assembled together by gluing or stitching technique.

Also this shoe has maintained the problems illustrated previously of poor general flexibility of the shoe and lack of protection in the required zones in addition to wear to the upper when it is stitched.

In particular, it has been found that one need of the market is to be able to have a shoe that has a flexible sole that is light and with acceptable production costs, which are conditions that are not obtainable with the currently used methods.

Further, more attentive users and demanding consumers have shown demand for a shoe that has a knitted fabric with a weave that is at the same time able to provide a suitable foot grip and protection in particular zones in addition to being footwear without discontinuity like the shoe of the cited patent application that through the presence of the functional elements inserted between the two stockings makes some zones of the upper non-homogeneous so that with time and prolonged use of the shoe they bother the foot and with the exerted pressure can cause irritations that limit the wearability of the footwear.

As is known, users today have great interest in all garments and accessories that are comfortable, practical, functional, and aesthetically pleasing in appearance and flexible in use.

SUMMARY OF THE INVENTION

The object of the present invention is substantially that of solving the problems of the prior art by overcoming the described details by a structure and procedure for making a shoe with knitted upper that in a single manufacturing sequence enables a shoe to be constructed that has a knitted upper and a sole obtained by direct injection of polyurethane.

A second object of the present invention is to have a structure and procedure for making a shoe with knitted upper that has important differentiated structures, both in terms of volume and elasticity with an upper provided with optimal structuring of the areas that contain the foot, which are elasticized, stiff, transparent and structured for containment and/or set up for good flexure.

Another object of the present invention is to have a structure and procedure for making a shoe with knitted upper that is able to adapt perfectly to the shape of the foot, having differentiated functions and behaviours to respond to all the use needs and to enable a user to obtain excellent binding and grip of the foot, optimum breathability, a decisively limited weight, support and significant comfort when worn, in addition to important flexibility of the sole.

Another object of the present invention is to have a structure and procedure for making a shoe with knitted upper that has a sole made with direct injection technology to give the shoe flexibility and lightness by making the shoe a single body.

A further object of the present invention is to make a structure and procedure for making a shoe with knitted upper that has a construction with a sole that is light, flexible and does not wear the upper above.

A procedure is disclosed for making a shoe with knitted upper comprising a first step of weaving/construction of an upper (2) consisting of a double stocking followed by a second step of forming the upper in which the two stockings are a sort of "tube" that is closed on one side (the tip), whereas the other end of the tube remains open, and the inner stocking is placed on a suitable shoe-tree and the outer stocking is turned on the preceding stocking to form a double layer.

A steam step follows where the upper on the shoe-tree is subjected to a steam jet that dampens and softens a thermosetting polymer yarn present in the weave followed by a drying step in which the upper passes through a high-temperature kiln to remove the residual humidity of the preceding step and make the upper return to the desired dimensions by taking the thermosetting polymeric yarn to the melting temperature. The procedure then provides a parking step in which the upper on the shoe-tree yields heat to the environment to lower the temperature of the upper, which is followed by a stabilization step in which the upper on the shoe-tree transits through a very low-temperature refrigerator that stabilizes the thermosetting polymer yarn to fix the upper dimensionally to continue with a step of removal from the shoe-tree when the upper is at ambient temperature.

In particular, during the step of forming the upper, the procedure provides for an insole (5) to be positioned that has an arch structure that is able to cover the entire area of the shoe-tree and extends uniformly on the sides of the shoe-tree, being slightly higher than the profile of the future sole and having a series of slots (50) of suitable shape and position.

Once removed from the shoe-tree, the upper is ready for the construction of a sole (7) in which the steps are provided of inserting the upper into a suitable shoe-tree of a mould, positioning the shoe-tree with the upper and closing between two rings of the mould for a step of polyurethane injection (6), in which the rings of the mould for the sole close to enclose the upper partially, so as to form a cavity insulated from the exterior that is suitable for polyurethane injection with filling of the mould for forming of the sole.

During the injection step, the presence of the arch structure (5) limits the transit of polyurethane to the inner part of the upper, permitting the transit of predetermined quantities of polyurethane only through the slots (50) so as to create joint points between sole and upper and with the inner stocking without interfering and without altering either the functional or aesthetic features. After injecting has terminated, the rings of the mould are opened and the complete shoe (upper+sole) is removed from the mould, with removal from the shoe-tree and obtaining of a shoe that is a single, homogeneous and compact body.

Not the least important object of the present invention is to make a structure and procedure for making a shoe with knitted upper that is easy to make and very functional.

These objects and still others, which will appear clearer in the course of the present description, are substantially achieved by a structure and procedure for making a shoe with knitted upper, as claimed below.

BRIEF DESCRIPTION OF DRAWINGS

Further features and advantages will be clearer from the detailed description of a structure and procedure for making a shoe with knitted upper, according to the present invention, made here below with reference to the attached drawings, which are provided merely by way of example and are thus not limiting, in which:

FIG. 5 shows schematically and in an exploded view the components of the shoe obtained with the procedure in question;

FIG. 6 shows in section an enlarged detail of the shoe in FIG. 1;

Figure 1:
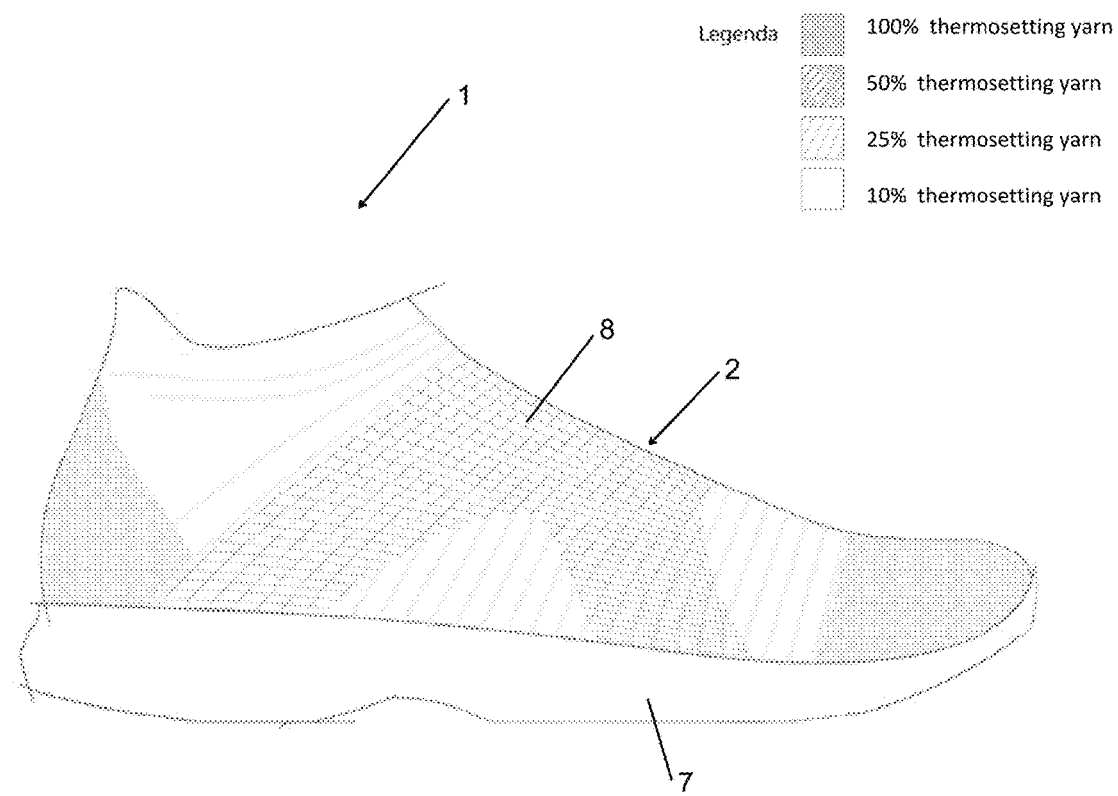
FIG. 1 shows schematically and in a lateral view a shoe obtained with the procedure according to the present invention.

With reference to the cited figures, and in particular to FIG. 1, a shoe 1 with an upper and sole obtained according to the present invention has been indicated overall.

DETAILED DESCRIPTION OF THE INVENTION

The procedure for making a shoe with knitted upper provides a sequence of steps, some of which have already been used to make shoes currently on the market.

In a first step there is the weaving/construction of an upper 2 which is made by making a double stocking starting from the tip of the foot, which is closed directly by the machine, to continue with the portion of the foot to reach the heel and end with an edge and continue with a sequence of parts opposite those previously made or second edge, heel, and portion of the foot to terminate with a second tip that is not however closed.

The two stockings make up the upper with a double layer as if it were a double skin where one stocking constitutes the exterior of the upper and is made by using natural, synthetic and/or mixed yarns whilst the other stocking constitutes, on the other hand, the interior of the upper and mainly consists of yarns of a different type, which are preferably natural like, for example, wool to provide other functions like: breathability, comfort, thermal insulation, etc). In addition to the yarns that have just been cited, during the entire production of the upper, an additional thermosetting polymeric yarn is added to the weave that is inserted into both stockings in well-defined areas and with differentiated densities so as to provide differentiated properties of elasticity, reinforcement and breathability as shown in FIG. 1. More in detail, in the outer stocking, thermosetting polymeric yarn is used in a higher percentage, which will give greater durability and resistance to the structure of the upper.

In addition, this enables this polymeric yarn used in the processing to act as a binder between the two stockings that joined together will constitute the upper as if it were a single piece.

Figure 9A:
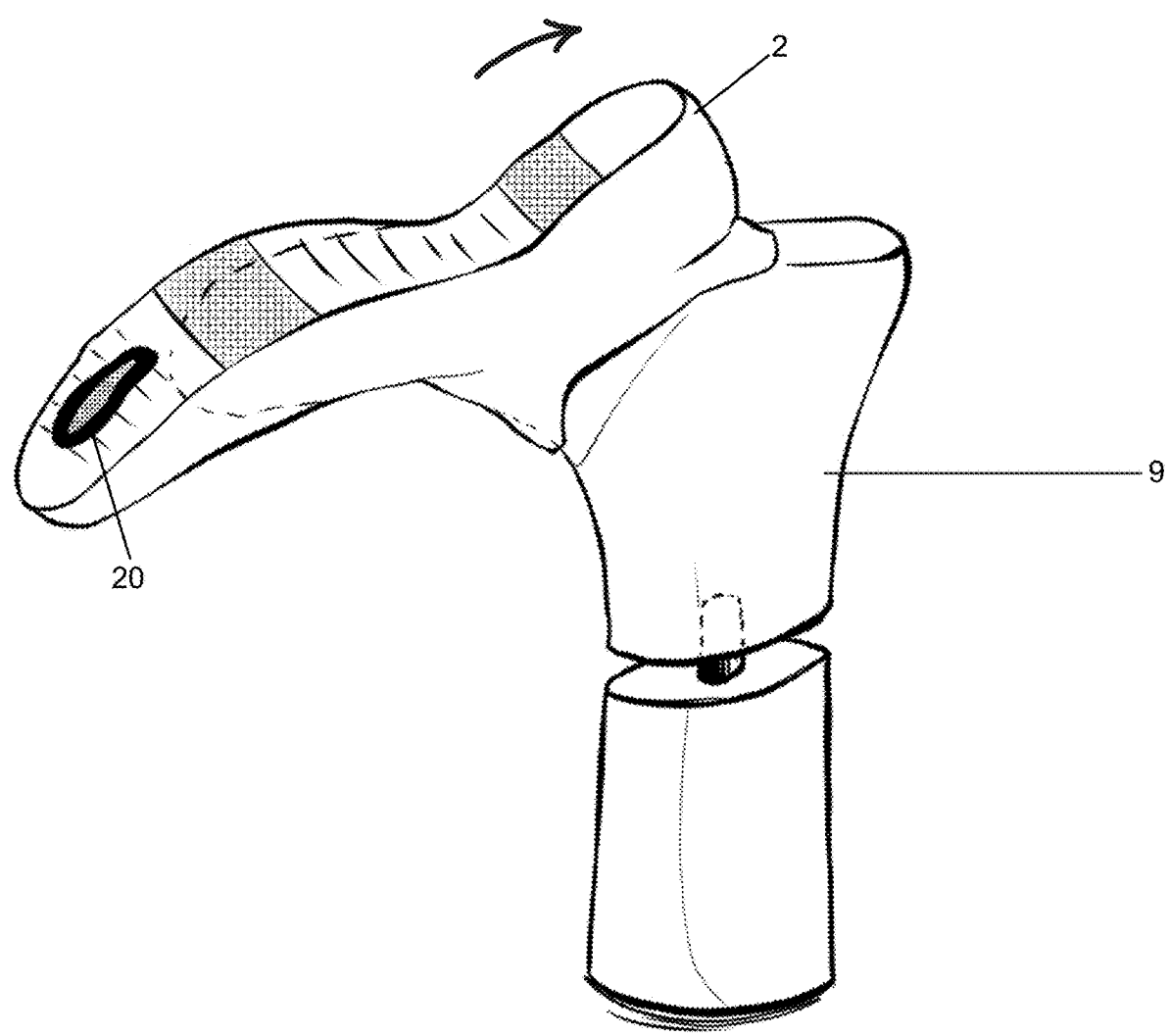
FIGS. 9A-9E show phases of construction of the shoe using a shoe tree and a mold having a shoe tree.

The second step is forming the upper. In this step, the two previously constructed stockings are a sort of "tube" that is closed on one side (the tip closed during processing), whilst the other end of the tube remains open. In this step, the inner stocking is arranged on a suitable shoe tree 9 and the outer stocking is rotated on the preceding one to form the upper consisting of a double layer. More in detail, the first stocking is initially placed with a closed end onto the shoe-tree 9 (FIG. 9A) and subsequently an insert 3 made of rubber or other equivalent and suitable material is placed so that it acts as padding, (collar) to reinforce and toughen the rear edge of the shoe. The second stocking with an open end is then pulled over the first to totally cover the shoe-tree. Once the two stockings have been coupled, the outer stocking is made to retreat onto the shoe-tree 9 so as to uncover the portion corresponding to the inner sole to enable a reinforcement 4 for the heel to be interposed between the two in a known manner.

Figure 9B:
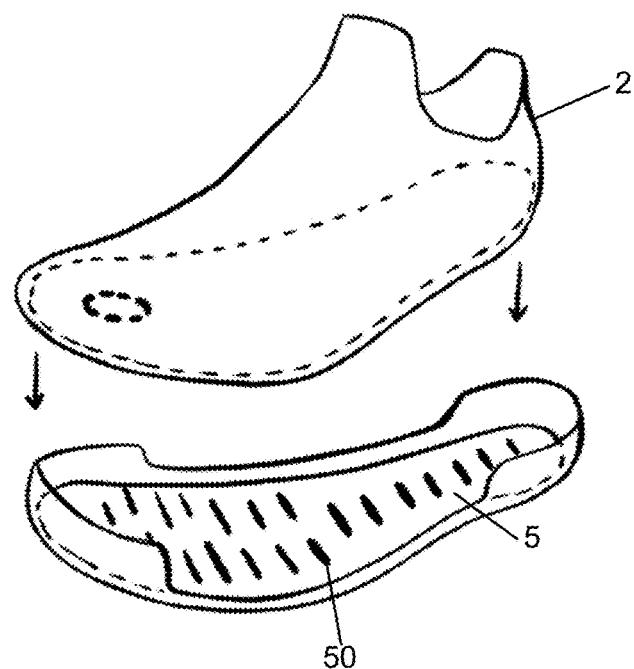
Figure 9C:
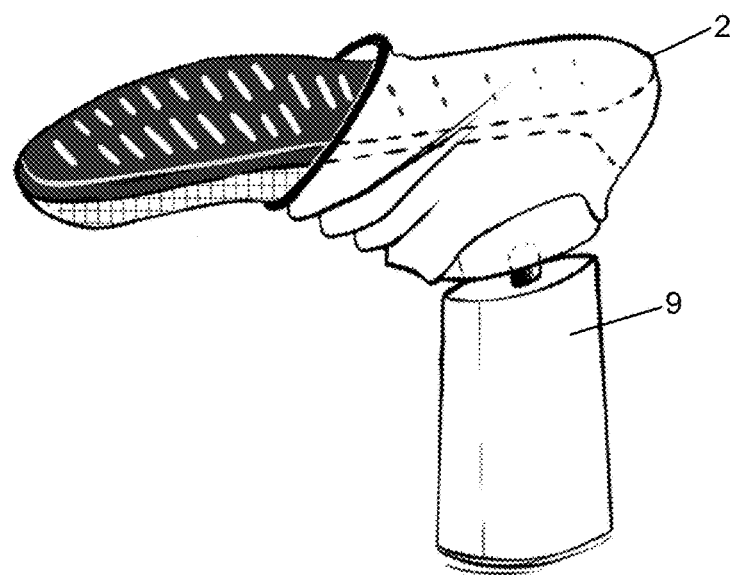

In the present embodiment, an insole 5 is positioned that has an arch structure that is able to cover the entire area of the shoe-tree (FIGS. 9B-9C) and extends uniformly on the sides of the shoe-tree. The insole is so configured as to cover the shoe-tree and protrude slightly from the profile of the future sole, as shown in FIG. 3B.

The inserted insole 5 is made of thermoformed felt and has a series of slots 50 of suitable shape and position, the function of which will be illustrated below.

Figure 2:
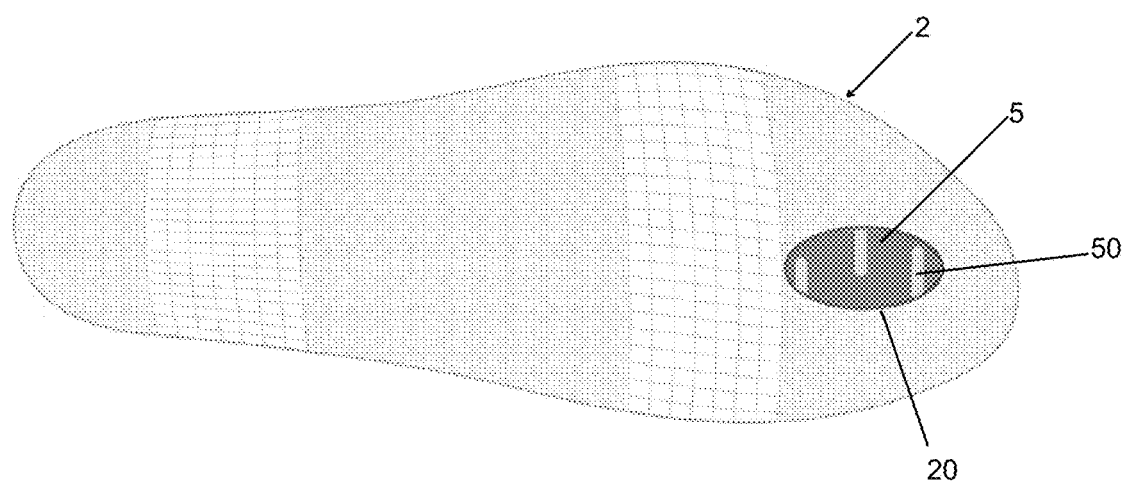
FIG. 2 shows schematically a bottom view of the upper of the shoe in FIG. 1.
Figure 9D:
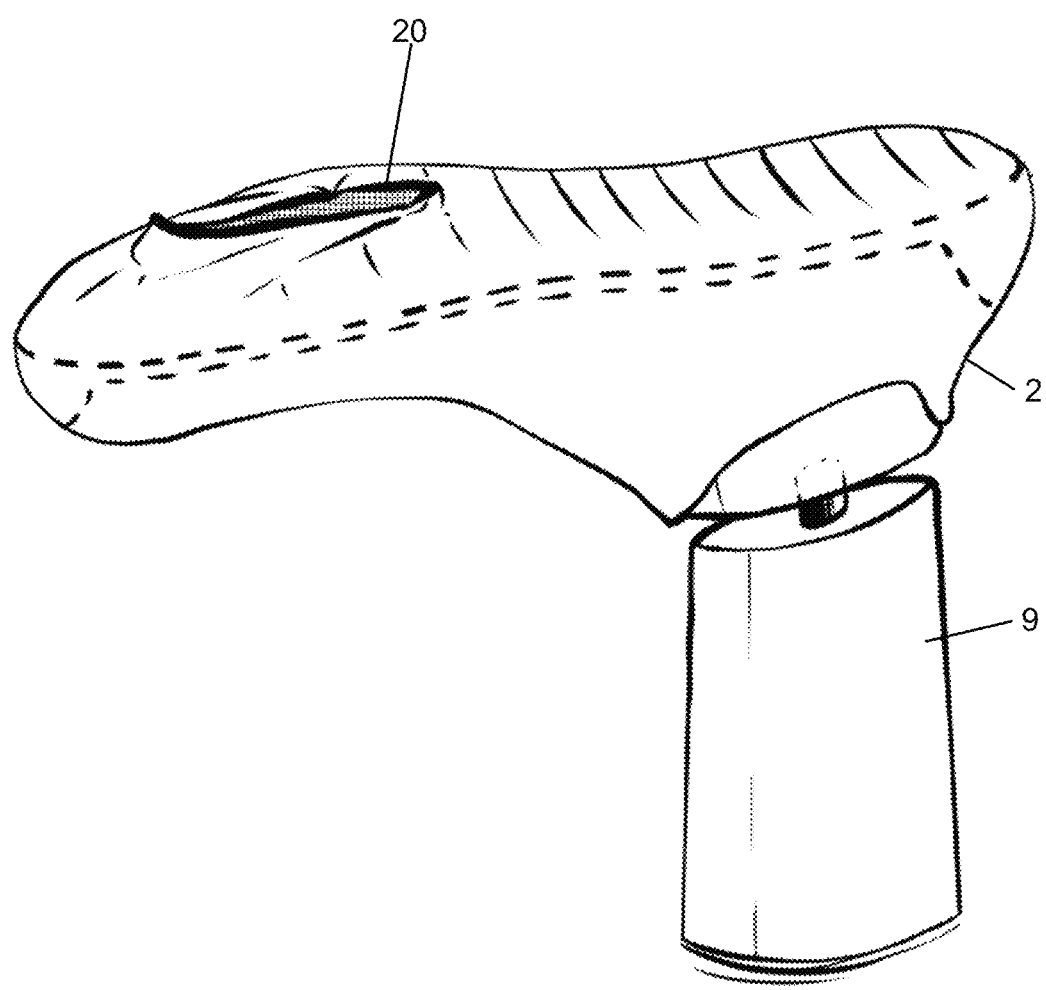

The outer stocking is then pulled and repositioned to close the upper by adapting perfectly to the shoe-tree until the open edge 20 is taken to the lower portion (FIGS. 9C-9D) at the attachment of the toes of the foot as shown in FIG. 2.

The two steps that follow are of known type in which the first defined as the upper on the shoe-tree is subjected to a steam jet that dampens and softens the thermosetting polymer yarn. This step enables the upper to adhere better to the shoe-tree and to prepare the upper for the subsequent step in which it is passed through a high-temperature kiln to enable the residual humidity of the preceding step to dry off the upper and enable the upper to return to the desired dimensions by taking the thermosetting polymeric yarn to the melting temperature.

This point is followed by a step defined as the parking step, which is a transition step between the preceding step and the subsequent step in which the upper on the shoe-tree exits the kiln and transits on a roller conveyor, yielding heat to the environment to lower the temperature of the upper before moving to the subsequent step of stabilization in which the temperature is lowered further.

More in detail, the parking step is a transition step with the task of avoiding too sharp a thermal shock between the step of passing into the kiln and the following step of stabilization.

In the stabilization step, the upper on the shoe-tree transits through a very low-temperature refrigerator that stabilizes thermosetting polymer yarn and with this step the upper is fixed dimensionally. When the upper is in equilibrium with the ambient temperature, it is removed from the shoe-tree and is ready for the subsequent steps.

In the steps that follow, a sole 7 is constructed on the upper by polyurethane injection moulding.

Figure 9E:
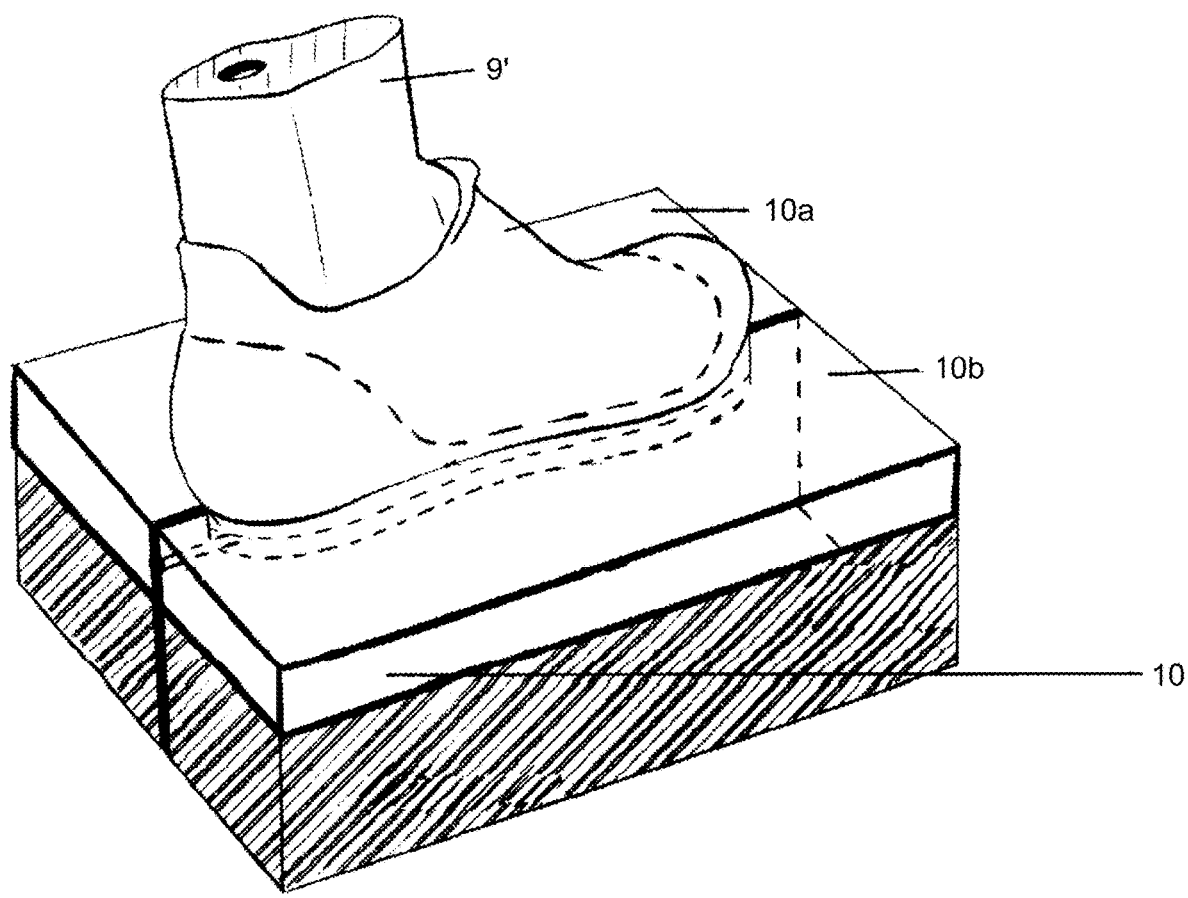

The upper is placed on a shoe-tree 9' of the mould 10 (FIG. 9E) where possible components to be overprinted can be positioned on the upper and fixed by gluing.

The upper on the shoe-tree 9' is placed in position to be subsequently closed between two portions 10a, 10b of the mould 10 during the step of polyurethane injection 6.

The portions 10a, 10b of the mould 10 for the sole are closed to enclose the upper partially, so as to form a cavity insulated from the exterior that is suitable for injecting the polyurethane and constituting the sole.

Once everything has been prepared as illustrated before, injection of the polyurethane 6 starts that, because of the presence of the arch structure 5, finds a barrier that limits the transit thereof to the inner part of the upper.

More in detail, the conformation of the arch structure 5 prevents the injected polyurethane of the sole passing to the inner stocking, but enables only predetermined quantities of polyurethane to be passed through the slots 50. The quantity of material that passes through the slots enables the joint points to be created between the sole and upper and, in particular, with the inner stocking as shown in FIG. 6.

Without the presence of the arch structure, as configured, an excessive quantity of polyurethane would filter through the upper, altering the functional and aesthetic features thereof. More precisely, the polyurethane passes, but only minimally, through the slots of the insole, and this transit is controlled and managed; the polyurethane that passes creates a uniform adhesion bridge between the inner stocking of the upper and the sole injected onto the upper to form the holding hooks 60.

Once the injection phase is over, the portions 10a, 10b of the mould 10 of the sole open and the shoe is complete (upper+sole) and is removed from the mould 10 and is then taken from the shoe-tree 9'.

There is a step of trimming possible moulding runs off the sole and the shoe is ready.

The shoe that exits the procedure illustrated previously has an upper, the production process of which has multiple types of processing, is a completely seamless upper (without any stitching), is made with reverse processing (i.e. on the back of the fabric) which enables the structure to be diversified with particular retained yarn features suitable for varying the regularity thereof to obtain a three-dimensional weave that gives the shoe structural and functional features.

In particular, during construction, the stocking provides in the side portion of the foot (fit) a series of ribs obtained with a particular weave that have the task of giving stability to the foot inside the shoe because they create a sort of gripping support of the side part of the foot, thus making the intermediate reinforcing and protection elements redundant that, to the contrary, are necessary in shoes of the prior art.

In addition what has been illustrated so far, during construction of the double stocking, a process is carried out that creates an X structure 8 which enables the upper to give significant and optimum binding to the foot.

The stocking has X processing, the crossing of which is positioned in the instep of the foot and the sides are arranged in front of the sides of the toes of the foot and behind, the X has the function of giving the foot containment and stability so that, for example, a containing structure is no longer necessary, as prescribed in the United States patent application cited in the initial part of the present description.

According to the present embodiment and as already mentioned, the distribution of the thermoset yarn studied and calibrated for every single portion of the footwear gives the upper structural and functional features that are very focused and particular.

As can be extrapolated from what has been described before, the shoe that is obtained with the illustrated process comprises an upper 2 formed by a pair of stockings, one overturned on the other, where inside the stockings only stabilizing elements are located like: the heel element 4 for protecting and stiffening this part and the padding element 3 of the collar, which are of substantially known type.

Figure 3:
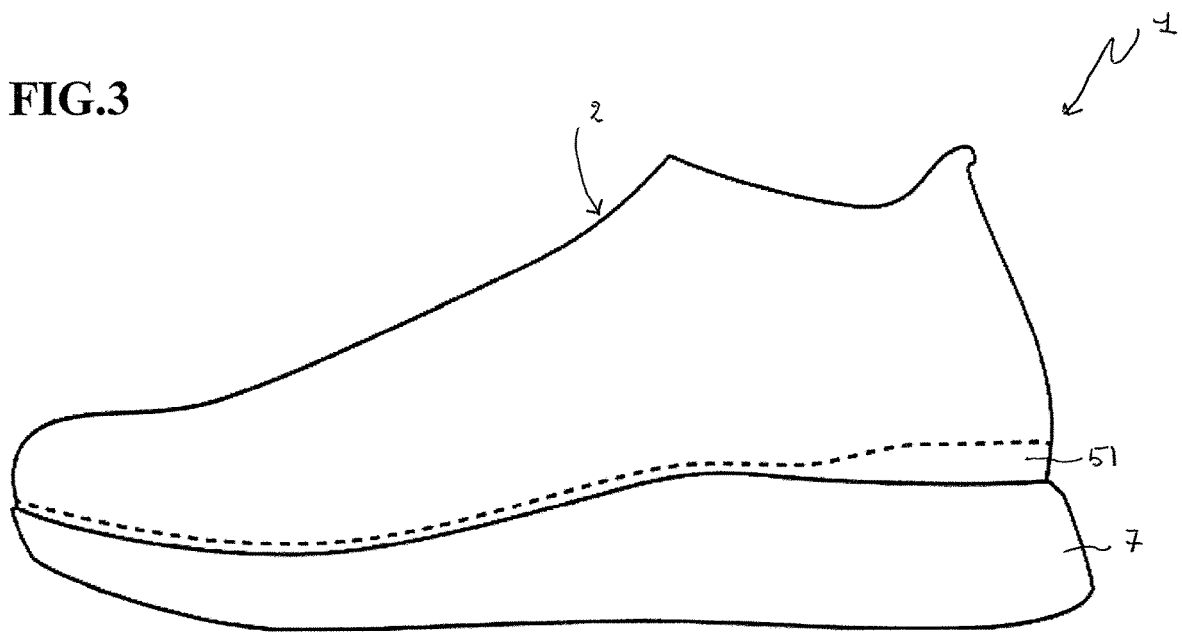
FIG. 3 shows schematically the shoe with the upper that comes into contact with the sole.
Figure 3A:
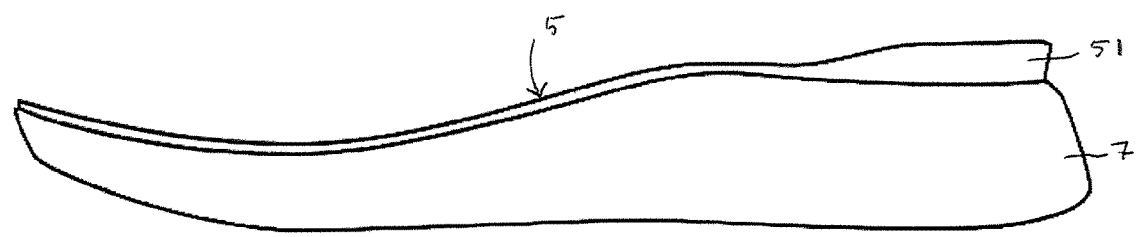
FIGS. 3A and 3B show schematically and in a side view two different versions of the sole.
Figure 3B:
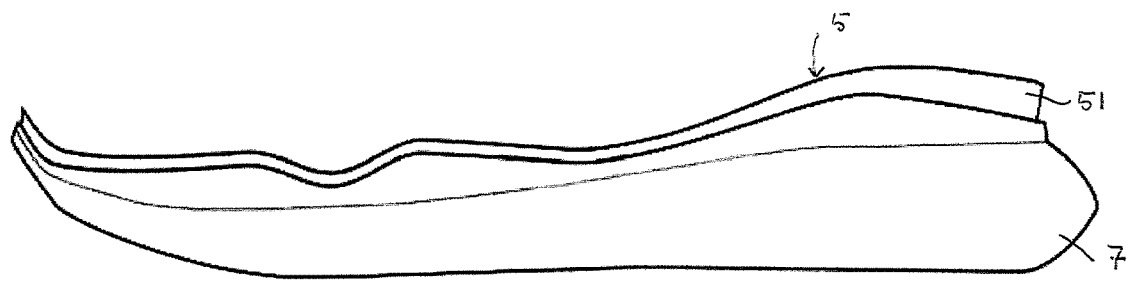

In accordance with the present invention, the arch structure 5 is shaped, variable and modulable in relation to the sole profile that it is desired to obtain as an aesthetic aspect as shown in FIG. 3A.

In fact, the arch structure, in the profile/section thereof, is always parallel to the shape of the sole 7 and always has the lateral edge 51 above the level of the sole by a predetermined amount, as shown in FIG. 3A and in FIG. 3B.

Further, the arch structure, being shaped, has an arched zone that follows the conformation of the plantar arch, as shown in FIG. 3B, and has the lateral edge 51 that enables both the foot of the user and the inner stocking to be protected that makes up the upper, as shown in FIG. 5.

Figure 4:
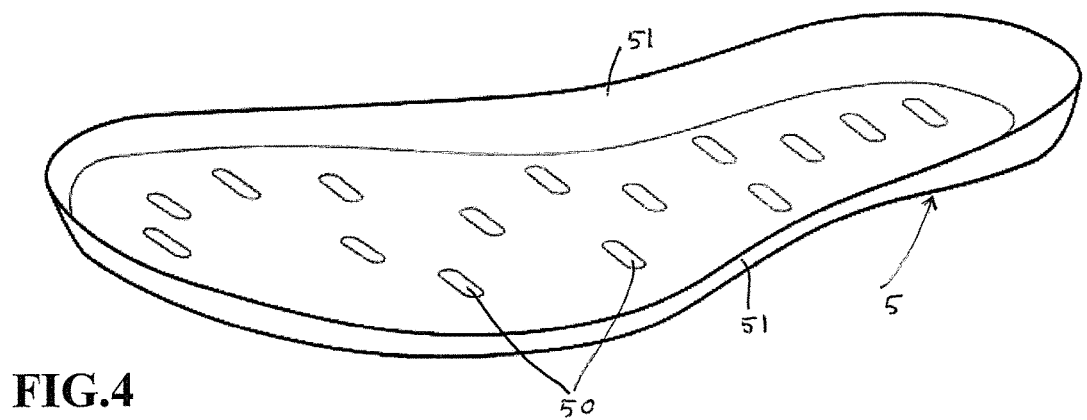
FIG. 4 shows schematically a detail of an element of the shoe of FIG. 1.
Figure 7:
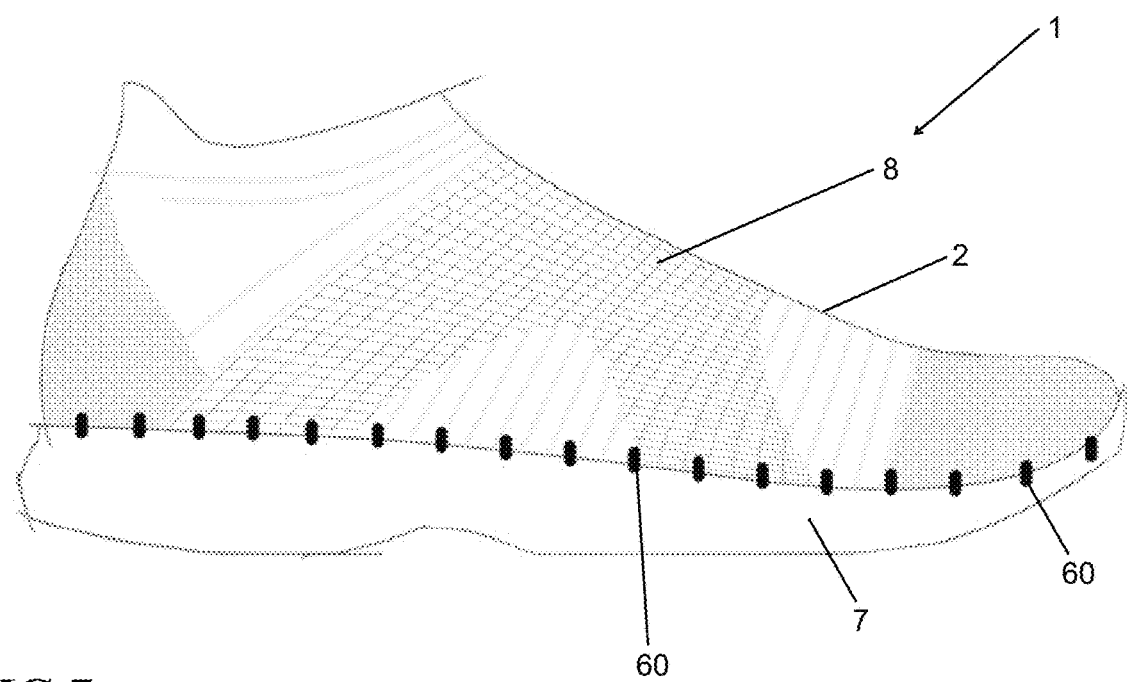
FIG. 7 shows schematically and in a sectioned lateral view the shoe in FIG. 1.
Figure 8:
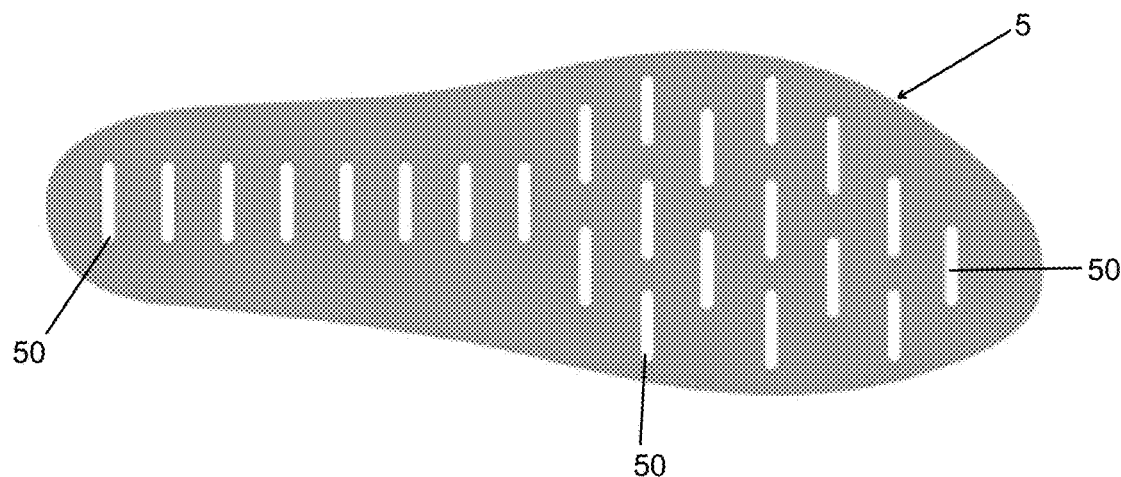
FIG. 8 shows a bottom view of the element in FIG. 4.

Further, as shown in FIG. 4, the surface of the arch structure has a plurality of suitably shaped and positioned slots 50 that have a precise function of creating points or sectors on the basis of the fixing and grip dimension thereof for fixing and gripping the stockings between themselves and with the arch structure 5 and the sole 7, making everything a single body.

According to the present embodiment and as mentioned previously, the arch structure 5 is thermoformed to adapt to the shape of the foot, has lateral edges 51 that enable the outer stocking be received and the portion that is folded to reduce wear to be protected and give greater comfort and sense of protection and grip to the foot.

In particular, the lateral edge 51 of the arch structure creates a raiser for the upper that is so positioned as to be continuous between the sole and upper, providing a uniform and continuous profile.

Further, the arch structure is made of felt, recycled material, so particular attention is paid to giving new life to materials that have already been used, in addition to the fact that it offers optimum adhesion.

In particular, when the polyurethane material is injected to make the sole, the arch structure is able to receive the material so that a good joint is created between outer stocking, arch structure and sole whilst the holding hooks 60 are formed where the slots are located, as shown in FIG. 6.

In fact, the arch structure 5 becomes a selective filter, a membrane that according to the holes, to the form and to the size enables different properties to be obtained.

Depending on the type of use of the shoe, differentiated stiffness or flexibility features can be given because a selective and organized transit of material is calibrated and managed to give both structural and functional specifications to the shoe.

The shoes that are currently on the market, as is also illustrated in the American patent cited in the initial part of the description, envisaged the presence—between the stockings—of an insole that was provided to give body and stability to a structure that then was meant to be glued to join the upper and sole.

According to the present invention, a knitted upper 2 is obtained that has good intrinsic flexibility that—together with an injected sole 7 that is rather thin and which is in itself and because of the method of the process itself much more flexible—makes the shoe very different from one with a moulded sole and which is then glued or stitched.

The combination of these production methods gives rise to a shoe with improved features of lightness, flexibility and grip between the parts, unlike what occurred with those made with prior-art systems.

The procedure in question is a manufacturing process that enables an object to be created that is a single, homogeneous and compact body, unlike those made until now that are merely assemblies of separate parts constructed at different moments and not in a single productive process.

As mentioned, the prior processes, having separate construction steps, gave rise to discontinuity and dishomogeneity in the structure of the shoe that with time gave rise to problems both at the level of the structural grip of the shoe and of comfort of the parts.

With the process in question, it is possible to obtain even a technical shoe in which, in the making of the sole, it is possible to insert reinforcing or lightening internal structural elements that give customized properties to the shoe, by gluing said reinforcing or lightening internal structural elements or by injected chemical gripping, depending on needs.

As mentioned previously, all the different types of structure of the upper are obtained during processing so there is no stitching that could cause annoyance, irritations or stress to the foot. In particular, in the delicate zones of the foot there isn't stitching and there are no inserts for example for inserting laces, as occurs with current shoes so they are very practical to put on and take off.

From what has been disclosed in a mainly structural sense, the operation of the invention is as follows.

When a user intends to walk or engage in sport, the user merely has to put on a pair of shoes according to the present invention and use the shoes in a manner completely identical to those currently in use with the difference that the support in the various zones of the foot will be differentiated from sector to sector, the comfort will be optimum and diversified according to the points of the foot, the air conditioning also be different from zone to zone, the heel will be protected from shocks and blows and other parts of the foot will be helped and further supported in addition to be protected in the various movements.

The present invention thus reaches the above objectives.

With the procedure in question it is possible, in a single manufacturing sequence, to make a shoe with knitted upper and with a sole obtained by a direct injection of polyurethane owing to the presence of the arch structure interposed between the two stockings that make up the upper.

Advantageously, with the procedure according to the present invention, a shoe with knitted upper is made that has important different structures, both in terms of volume and of elasticity with an upper provided with optimum structuring of the areas that contain the foot, which areas are elasticized, stiff, breathable and structured for containment or set up for good flexure.

Further, this process enables a shoe with knitted upper to be made that is able to adapt perfectly to the shape of the foot, having differentiated functions and behaviours to meet all use requirements.

In particular, the procedure for making a shoe with knitted upper has a sole made with direct injection technology that enables the shoe to be given flexibility and lightness.

Another advantage of the process is making a shoe with knitted upper that is able to offer the user an optimum grip of the foot, excellent breathability, a decisively limited weight, a support and significant comfort when worn as well as excellent flexibility of the sole. Further, the shoe that is obtained ensures excellent binding and grip of the foot.

The upper for footwear in question is made of a single piece, finished in the machine without discontinuity, stitching and is able to adapt perfectly to the shape of the foot, has differentiated processing and differentiated plaiting in processing that enable footwear to be obtained that offers excellent breathability with different ventilation zones and circulation of air according to needs, protection of the parts of the foot against possible blows and stress with a stiffer or more flexible weave on the basis of the need to give the foot protection and comfort.

Another advantage of the upper according to the present invention is being able to adapt perfectly to the shape the foot without annoying thicknesses that are due to the functional inserts, as occurs with the shoes of the prior art so that they improve the performance of the user because, as disturbing and annoying elements are reduced, they make the movements of the user safer.

A further advantage is due to the fact that the shoe in question is simple to make and is very functional.

Naturally, numerous amendments and variations can be made to the present invention, which are all part of the scope of the inventive concept that characterizes the invention.

The invention claimed is:

1. A method for making a shoe with a knitted upper, the method comprising:
    creating an upper which is made by knitting a double stocking including an inner stocking portion and an outer stocking portion, the double stocking having a tube shape that is closed on an end of the inner stocking portion and open on an end of the outer stocking portion;
    forming the upper by placing the inner stocking portion on a shoe-tree and turning the outer stocking portion on the inner stocking portion to form a double layer;
    subjecting the upper on the shoe-tree to a steam jet that dampens and softens a thermosetting polymer yarn included in the upper;
    passing the upper through a kiln to dry off residual humidity from the subjecting of the upper to the steam jet, and to heat the upper to a melting temperature of the thermosetting polymeric yarn such that dimensions of the upper return to initial dimensions, the initial dimensions being dimensions of the upper prior to the subjecting of the upper to the steam jet;
    when the upper on the shoe-tree exits the kiln, transporting the upper on the shoe-tree on a roller conveyor so as to yield heat to an environment external to the kiln and thereby lower a temperature of the upper on the shoe-tree;
    transporting the upper on the shoe-tree through a refrigerator that stabilizes the thermosetting polymer yarn to fix the upper dimensionally;
    removing the upper from the shoe-tree when the upper is at an ambient temperature,
    wherein during the forming of the upper, an insole comprising an arch structure is positioned, the insole covering an entire sole area of the shoe-tree and extending upward along sides of the shoe-tree, the insole being made of thermoformed felt and having a series of slots which are shaped and positioned to create fixing and gripping points for the inner and outer stocking portions between themselves and with the insole and a sole of the shoe;
    after the removing of the upper from the shoe-tree, constructing the sole by:
        inserting the upper into a shoe-tree of a mould;
        positioning the shoe-tree of the mould with the upper between two portions of the mould, and closing the portions of the mould so as to partially enclose the upper and form a cavity insulated from an exterior;
        injecting polyurethane into the cavity in the mould, wherein the insole forms a barrier in the cavity that limits the passage of the injected polyurethane into an inner part of the upper, wherein only a predetermined quantity of the injected polyurethane passes through the slots of the insole so as to form the fixing and gripping points between the sole and the insole and the inner and outer stockings;
        opening the portions of the mould once the injecting of the polyurethane has terminated; and
        removing the upper and the sole as a single unit from the mould and from the shoe-tree of the mould.

2. The method according to claim 1, wherein, during the creating of the upper, the thermosetting polymeric yarn is added to yarns of the knit so as to be inserted into the inner and outer stocking portions so as to create defined areas with different densities of the thermosetting polymeric yarn so as to provide different properties of elasticity, reinforcement and breathability,
    wherein the outer stocking portion includes a higher percentage of the thermosetting polymeric yarn than the inner stocking portion such that the outer stocking portion has greater hardness and resistance, and
    wherein by the heating of the thermosetting polymeric yarn to the melting temperature and the transporting of the upper through the refrigerator, the thermosetting polymeric yarn acts as a binder between the inner and outer stocking portions so as to form the upper as one integral piece.

3. The method according to claim 1, wherein in the placing of the inner stocking portion on the shoe-tree, the inner stocking portion is initially inserted with the closed end of the inner stocking portion on the shoe-tree, and subsequently an insert made of a padding material is positioned to form a collar for reinforcing a rear edge of the shoe, and the outer stocking portion with the open end is then pulled over the inner stocking portion to totally cover the shoe-tree, and
    once the inner and outer stocking portions have been coupled, the outer stocking portion is retracted on the shoe-tree so as to uncover a portion corresponding to the insole so as to enable a reinforcement to be inserted for the heel.

4. The method according to claim 1, wherein during the forming of the upper, once the insole is positioned, the outer stocking portion is then pulled and repositioned to close the upper, wherein an edge of the open end of the outer stocking portion is brought to a lower portion of the upper at a position which is beneath toes of a user when the shoe is worn by the user.

5. The method according to claim 1, wherein in the inserting of the upper into the shoe-tree of the mould, components to be overprinted are positioned on the upper and fixed by gluing.

6. The method according to claim 1, wherein in the injecting of the polyurethane, the predetermined quantity of polyurethane passes through the slots of the insole so as to create a uniform adhesion bridge between the inner stocking portion of the upper and the sole, and so as to form the fixing and gripping points as holding hooks.

7. The method according to claim 1, wherein the outer stocking portion forms an exterior of the upper and further comprises yarn comprising natural, synthetic or mixed fibers, and the inner stocking portion forms an interior of the upper and further comprises yarn mainly comprising fibers different than those of the outer stocking portion.

8. The method according to claim 7, wherein the fibers of the inner stocking portion that are different than those of the outer stocking portion are natural fibers.

9. The method according to claim 1, further comprising trimming moulding runs from the sole.

10. The method according to claim 1, wherein during knitting of the double stocking, processing is carried out that creates an X-shaped structure which enables the upper to optimally bind to a foot of a user when the shoe is worn by the user, wherein a cross portion of the X structure is positioned so as to lie on an instep of the foot of the user and ends of the X-shaped structure are arranged at front sides and rear sides of the foot of the user when the shoe is worn by the user.

11. The method according to claim 1, wherein during the injecting of the polyurethane, the insole is able to receive the polyurethane so that a joint is created between the outer stocking portion, the insole and the sole via the fixing and gripping points which are formed as holding hooks in the slots.

* * * * *